United States Patent
Peng et al.

(10) Patent No.: US 10,803,077 B2
(45) Date of Patent: Oct. 13, 2020

(54) APPLYING TEMPLATES TO CUSTOMIZE PRESENTATION OF CONTENT BASED ON SURFACE TYPE

(71) Applicant: Facebook, Inc., Menlo Park, CA (US)

(72) Inventors: Fuchun Peng, Cupertino, CA (US); Bo Zeng, Fremont, CA (US); Kun Han, Sunnyvale, CA (US); Benoit Dumoulin, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 146 days.

(21) Appl. No.: 15/966,494

(22) Filed: Apr. 30, 2018

(65) Prior Publication Data

US 2019/0332709 A1 Oct. 31, 2019

(51) Int. Cl.
| | | |
|---|---|---|
| *G06F 16/00* | (2019.01) | |
| *G06F 16/248* | (2019.01) | |
| *G06F 16/9535* | (2019.01) | |
| *G06F 16/2457* | (2019.01) | |
| *G06F 40/186* | (2020.01) | |

(52) U.S. Cl.
CPC ...... *G06F 16/248* (2019.01); *G06F 16/24578* (2019.01); *G06F 16/9535* (2019.01); *G06F 40/186* (2020.01)

(58) Field of Classification Search
CPC ............. G06F 16/9535; G06F 16/2428; G06F 16/24578; G06F 16/248; G06F 16/40; G06F 17/212; G06F 17/248; G06F 40/186; G06F 16/9577; G06F 40/106
See application file for complete search history.

(56) References Cited

U.S. PATENT DOCUMENTS

| | | | | |
|---|---|---|---|---|
| 7,565,175 | B2 * | 7/2009 | Pell | H04M 1/72561 455/566 |
| 8,771,066 | B2 * | 7/2014 | Adiraju | G07F 17/323 463/31 |
| 9,807,474 | B2 * | 10/2017 | Gibbon | H04N 21/26283 |
| 9,948,535 | B2 * | 4/2018 | Suri | G06Q 50/01 |
| 10,657,322 | B2 * | 5/2020 | Amerige | G06F 40/186 |
| 2009/0125809 | A1 | 5/2009 | Trapani et al. | |
| 2014/0281892 | A1 * | 9/2014 | Baldwin | G06F 40/186 715/234 |
| 2015/0019545 | A1 | 1/2015 | Chedeau et al. | |

(Continued)

FOREIGN PATENT DOCUMENTS

WO   WO 2014/190297 A1   11/2014

OTHER PUBLICATIONS

PCT International Search Report and Written Opinion, PCT Application No. PCT/US2018/030510, dated Jan. 28, 2019, eleven pages.

*Primary Examiner* — Merilyn P Nguyen
(74) *Attorney, Agent, or Firm* — Fenwick & West LLP (57) ABSTRACT

An online system receives a request to generate presentation content for presentation to a user. The online system receives a set of content items and identifies a surface for presenting the presentation information to the user. For example, the surface may be a voice only surface, a voice and graphical display, a graphical display only. Based on the identified surface, the online system ranks the set of content items. The online system then determines presentation information for a subset of the content items and transmits instructions to present the presentation information at the surface.

14 Claims, 7 Drawing Sheets

(56) References Cited

U.S. PATENT DOCUMENTS

| | | | |
|---|---|---|---|
| 2015/0040098 A1 | 2/2015 | Akins et al. | |
| 2015/0143436 A1* | 5/2015 | Gibbon | H04N 21/8549 725/88 |
| 2015/0149544 A1* | 5/2015 | Zhang | G06Q 10/109 709/204 |
| 2015/0350146 A1* | 12/2015 | Cary | H04L 67/2823 709/206 |
| 2016/0034594 A1* | 2/2016 | Baldwin | G06F 40/186 715/234 |
| 2016/0055159 A1* | 2/2016 | Connolly | G06F 16/24578 707/734 |
| 2016/0182617 A1 | 6/2016 | Mengle et al. | |
| 2017/0220701 A1* | 8/2017 | Marantz | G06F 17/212 |
| 2017/0279749 A1* | 9/2017 | Forster | H04L 51/36 |
| 2018/0048595 A1* | 2/2018 | Dotan-Cohen | H04L 51/08 |
| 2018/0181549 A1* | 6/2018 | Hileman | G06F 16/4393 |
| 2019/0220922 A1* | 7/2019 | Barkas | G06Q 40/12 |

\* cited by examiner

APPLYING TEMPLATES TO CUSTOMIZE PRESENTATION OF CONTENT BASED ON SURFACE TYPE

BACKGROUND

This disclosure relates generally to presenting content items in an online system, and more particularly to customizing the presentation of content items.

Online systems may provide newsfeeds and daily updates to users including many types of content items. Content items are personalized to the user's interests, and may include world news and social news. It is valuable for an online system to promote content with which a viewing user is likely to interact through actions such as liking, sharing, commenting, and performing other types of user engagement.

It is increasingly common for users to access the online system through multiple client devices. Client devices may have different presentation surface types, such as an audio only output, a graphical display only, or an audio and graphical output. Additionally, client devices may have smaller or larger graphical displays. Different client devices with different surface types may make it difficult to consume particular types of content items. For example, a user may be unable to correctly access content items including graphical elements such as photos or videos on a client device with only audio output. Similarly, a user may be unable to correctly access content items including audio elements on a client device with only a graphical display.

Presenting content items that are difficult to access or difficult to interact with can negatively impact the experience of the viewing user, even if the content items are otherwise relevant to the user. This can reduce the efficiency of the user interface of the client device as the information presented may be difficult for the user to understand. Similarly, even presentation of surface-appropriate content may be less efficient, as the user may be distracted by content that is not appropriate for the surface type.

SUMMARY

The above and other issues are addressed by an online system that retrieves ranked content items (e.g., from an existing newsfeed manager) and re-ranks the content items. A template is applied to customize the presentation of the content item based at least in part on the surface type associated with a client device on which they will be presented. By re-ranking the content items and selecting templates that are compatible with the surface type of the client device, the online system may improve the accessibility and understandability of the content items to the user of the client device.

In various embodiments, the online system receives a request from a client device to generate content items to present to a user of the client device. The online system receives a set of content items available for presentation to the user. The online system then identifies a surface type for presenting the content items to the user. The surface type may be voice only, voice and graphical, graphical display only, or the like. Based on the identified surface type, the online system ranks the set of content items such that content items that are compatible with the surface type are more likely to be presented to the user. For example, a content item including a set of photos is more likely to be presented on a client device with a graphical display than on a client device with voice only outputs.

The online system additionally determines presentation information for a subset of the ranked set of content items. In one embodiment, the online system selects templates for each of the subset of the content items based on the surface type of the client device. Each template includes empty or modifiable fields that are filled with elements from the content items. The online system uses the completed templates to generate presentation information and transmits the instructions to present the content items to the client device.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
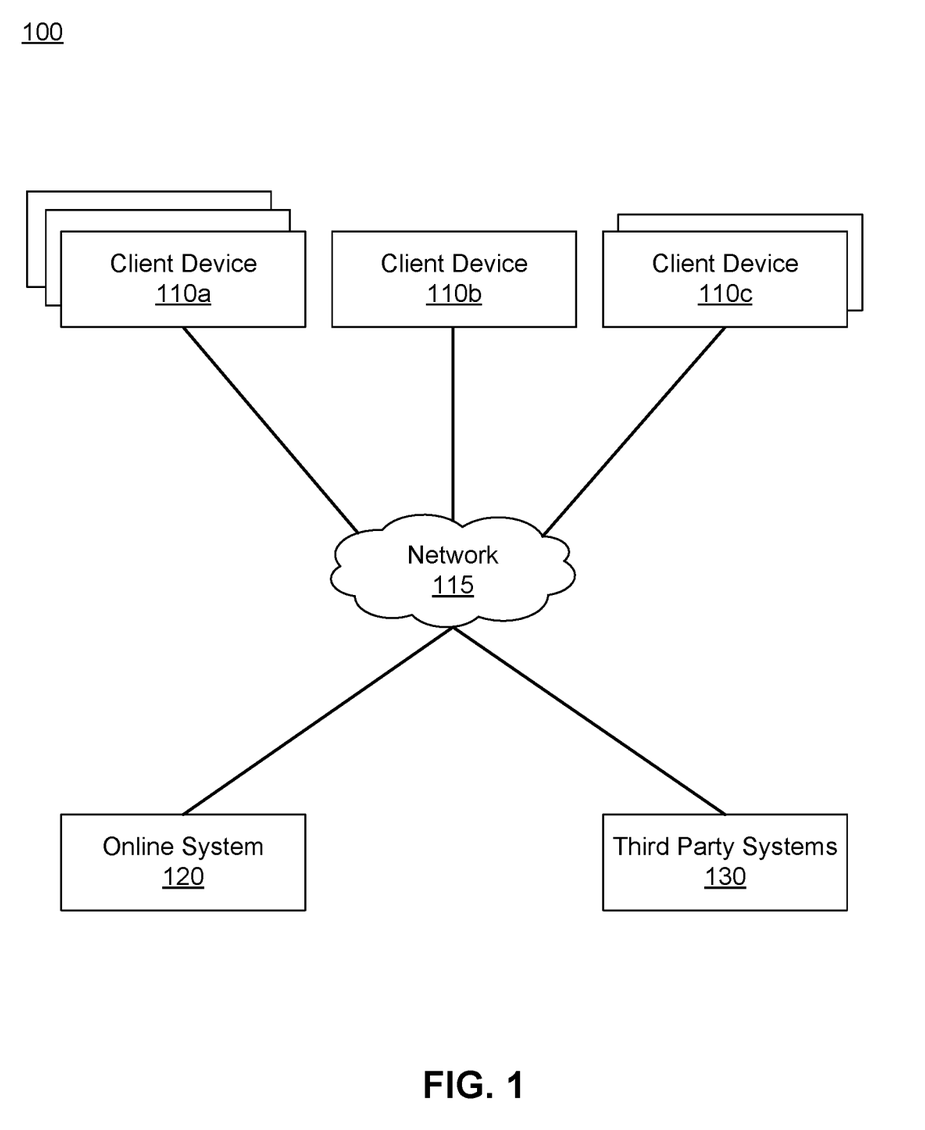
FIG. 1 is a block diagram of a system environment in which an online system operates, in accordance with an embodiment.

FIG. 1 is a block diagram of a system environment 100 for an online system 120. The system environment 100 shown by FIG. 1 comprises one or more client devices 110, a network 115, one or more third-party systems 130, and the online system 120. In alternative configurations, different and/or additional components may be included in the system environment 100. For example, the online system 120 is a social networking system, a content sharing network, or another system providing content to users.

The client devices 110 are one or more computing devices capable of receiving user input as well as transmitting and/or receiving data via the network 115. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 115. In one embodiment, a client device 110 executes an application allowing a user of the client device 110 to interact with the online system 120. For example, a client device 110 executes a browser application to enable interaction between the client device 110 and the online system 120 via the network 115. In another embodiment, a client device 110 interacts with the online system 120 through an application programming interface (API) running on a native operating system of the client device 110, such as IOS® or ANDROID™.

The client devices 110 are configured to communicate via the network 115, which may comprise any combination of local area and/or wide area networks, using both wired and/or wireless communication systems. In one embodiment, the network 115 uses standard communications technologies and/or protocols. For example, the network 115 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 115 may be represented using any suitable format, such as hypertext markup language (HTML) or extensible markup language (XML). In some embodiments, all or some of the communication links of the network 115 may be encrypted using any suitable technique or techniques.

In one embodiment, client devices 110 are associated with users of the online system 120. For example, the online system 120 may identify client devices 110 associated with users of the online system based on a login received on a client device. A user may have one or more associated client devices 110, as shown. In other embodiments, a user may have additional or fewer client devices 110. The online system 120 may additionally associate client devices 110 with an output surface type. In one embodiment, an output surface type may be voice only, voice and visual display, or visual display only. In other embodiments, other output surface types may be associated with client devices 110. The output surface type of a client device 110 includes information about available types of output data. For example, a voice only client device 110 outputs audio data. In another example, a voice and visual display client device 110 outputs audio data and graphical data, including text, images, videos, and others. Client devices 110 associated with a visual display surface type may additionally include information associated with a display size.

One or more third party systems 130 may be coupled to the network 115 for communicating with the online system 120, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 120, such as advertisements, content, or information about an application provided by the third party system 130.

Figure 2:
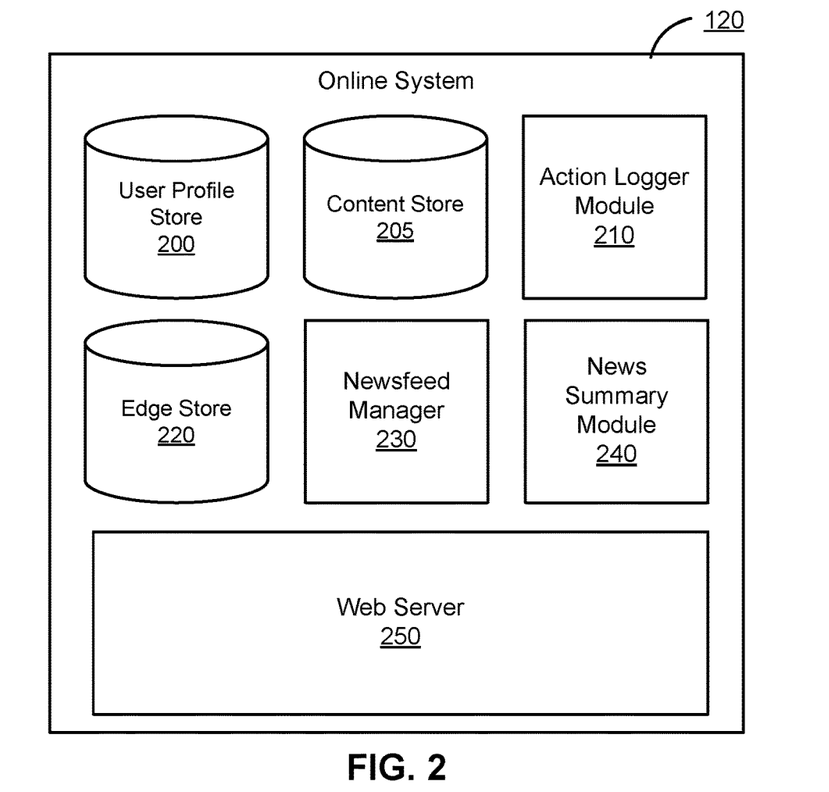
FIG. 2 is a block diagram of an architecture of the online system, in accordance with an embodiment.

FIG. 2 is a block diagram of an architecture of the online system 120. The online system 120 shown in FIG. 2 includes a user profile store 200, a content store 205, an action logger module 210, an edge store 220, a newsfeed manager 230, a re-ranking module 240, a template store 250, a presentation module 260, and a web server 270. In other embodiments, the online system 120 may include additional, fewer, or different components for various applications. Conventional components such as network interfaces, security functions, load balancers, failover servers, management and network operations consoles, and the like are not shown so as to not obscure the details of the system architecture.

Each user of the online system 120 is associated with a user profile, which is stored in the user profile store 200. A user profile includes declarative information about the user that was explicitly shared by the user and may also include profile information inferred by the online system 120. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 200 may also maintain references to actions by the corresponding user performed on content items in the content store 205 and stored in the action logger module 210.

While user profiles in the user profile store 200 are frequently associated with individuals, allowing individuals to interact with each other via the online system 120, user profiles may also be stored for entities such as businesses or organizations. This allows an entity to establish a presence on the online system 120 for connecting and exchanging content with other online system users. The entity may post information about itself, about its products or provide other information to users of the online system 120 using a brand page associated with the entity's user profile. Other users of the online system 120 may connect to the brand page to receive information posted to the brand page or to receive information from the brand page. A user profile associated with the brand page may include information about the entity itself, providing users with background or informational data about the entity.

The content store 205 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 205, such as status updates, photos tagged by users to be associated with other objects in the online system 120, events, groups or applications. In some embodiments, objects are received from third-party applications or third-party applications separate from the online system 120. In one embodiment, objects in the content store 205 represent single pieces of content, or content "items." Hence, online system users are encouraged to communicate with each other by posting text and content items of various types of media to the online system 120 through various communication channels. This increases the amount of interaction of users with each other and increases the frequency with which users interact within the online system 120.

The action logger module 210 receives communications about user actions internal to and/or external to the online system 120, populating an action log with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action logger module 210.

The action logger module 210 may be used by the online system 120 to track user actions on the online system 120, as well as actions on third party systems 130 that communicate information to the online system 120. Users may interact with various objects on the online system 120, and information describing these interactions is stored in the action logger module 210. Examples of interactions with objects include: commenting on posts, sharing links, checking-in to physical locations via a client device 110, accessing content items, and any other suitable interactions. Additional examples of interactions with objects on the online system 120 that are included in the action logger module 210 include: commenting on a photo album, communicating with a user, establishing a connection with an object, joining an event, joining a group, creating an event, authorizing an application, using an application, expressing a preference for an object ("liking" the object), and engaging in a transaction. Additionally, the action logger module 210 may record a user's interactions with advertisements on the online system 120 as well as with other applications operating on the online system 120. In some embodiments, data from the action logger module 210 is used to infer interests or preferences of a user, augmenting the interests included in the user's user profile and allowing a more complete understanding of user preferences.

The action logger module 210 may also store user actions taken on a third party system 130, such as an external website, and communicated to the online system 120. For example, an e-commerce website may recognize a user of an online system 120 through a social plug-in enabling the e-commerce website to identify the user of the online system 120. Because users of the online system 120 are uniquely identifiable, e-commerce websites, such as in the preceding example, may communicate information about a user's actions outside of the online system 120 to the online system 120 for association with the user. Hence, the action logger module 210 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger module 210 by the application for recordation and association with the user in the action log.

In one embodiment, the edge store 220 stores information describing connections between users and other objects on the online system 120 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 120, such as expressing interest in a page on the online system 120, sharing a link with other users of the online system 120, and commenting on posts made by other users of the online system 120. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 120, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 220 also stores information about edges, such as affinity scores for objects, interests, and other users. Affinity scores, or "affinities," may be computed by the online system 120 over time to approximate a user's interest in an object or in another user in the online system 120 based on the actions performed by the user. A user's affinity may be computed by the online system 120 over time to approximate the user's interest in an object, in a topic, or in another user in the online system 120 based on actions performed by the user. Multiple interactions between a user and a specific object may be stored as a single edge in the edge store 220, in one embodiment. Alternatively, each interaction between a user and a specific object is stored as a separate edge. In some embodiments, connections between users may be stored in the user profile store 200, or the user profile store 200 may access the edge store 220 to determine connections between users.

In a case wherein a user accesses the online system 120 via a standard device such as a laptop or desktop computer or a mobile phone, the online system 120 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 230 may generate stories for presentation to a user based on information in the action log 215 and in the edge store 220 or may select candidate stories included in the content store 205. One or more of the candidate stories are selected and presented to a user by the newsfeed manager 230. In one embodiment, the newsfeed manager 230 ranks candidate stories and selects which ones to present in the user's newsfeed based on the rankings.

For example, the newsfeed manager 230 receives a request to present one or more stories to an online system user. The newsfeed manager 230 accesses one or more of the user profile store 200, the content store 205, the action logger module 210, and the edge store 220 to retrieve information about the identified user. For example, stories or other data associated with users connected to the identified user are retrieved. The retrieved stories or other data are analyzed by the newsfeed manager 230 to identify candidate content items, which include content having at least a threshold likelihood of being relevant to the user. For example, stories associated with users not connected to the identified user or stories associated with users for which the identified user has less than a threshold affinity are discarded as candidate stories. Based on various criteria, the newsfeed manager 230 selects one or more of the candidate stories for presentation to the identified user. In one embodiment, the newsfeed manager 230 generates a ranked list of content items with each content item's ranking determined by the user's affinity with that content item.

In various embodiments, the newsfeed manager 230 presents stories to a user through a newsfeed including a plurality of stories selected for presentation to the user. The newsfeed may include a limited number of stories (e.g., retrieved from a newsfeed generator with an existing ranking) or may include a complete set of candidate stories. The number of stories included in a newsfeed may be determined in part by a user preference included in user profile store 200. The newsfeed manager 230 may also determine the order in which selected stories are presented via the newsfeed. For example, the newsfeed manager 230 determines that a user has a highest affinity for a specific user and increases the number of stories in the newsfeed associated with the specific user or modifies the positions in the newsfeed where stories associated with the specific user are presented.

The newsfeed manager 230 may also account for actions by a user indicating a preference for types of stories and selects stories having the same, or similar, types for inclusion in the newsfeed. Additionally, the newsfeed manager 230 may analyze stories received by the online system 120 from various users to obtain information about user preferences or actions from the analyzed stories. This information may be used to refine subsequent selection of stories for newsfeeds presented to various users.

The news summary module 240 receives a ranked list of content items for presentation for a user of the online system 120 (e.g., a set of stories as ranked by the newsfeed manager 230) and generates content to present (presentation information) from the content items based on an identified surface type of a client device 110 (e.g., audio only, graphical only, or both audio and graphical). In one embodiment, the news summary module 240 identifies the surface type of a client device 110 in real time as updates are requested by a user of the client device. In other embodiments, the news summary module 240 automatically generates presentation information at designated times or time intervals for a particular surface type and client device 110. The news summary module 240 selects a subset of the content items to present based on the new rankings and applies templates to the selected content items to generate presentation information that is tailored to the surface type of the client device 110. Embodiments of the news summary module 240 are described in greater detail below, with reference to FIG. 3.

The web server 270 links the online system 120 via the network 115 to the one or more client devices 110, as well as to the one or more third party systems 130. The web server 270 serves web pages, as well as other content, such as JAVA®, FLASH®, XML and so forth. The web server 270 may receive and route messages between the online system 120 and the client device 110, for example, instant messages, queued messages (e.g., email), text messages, short message service (SMS) messages, or messages sent using any other suitable messaging technique. A user may send a request to the web server 270 to upload information (e.g., images or videos) that are stored in the content store 205. Additionally, the web server 270 may provide application programming interface (API) functionality to send data directly to native client device operating systems, such as IOS®, ANDROID™, or BlackberryOS.

Figure 3:
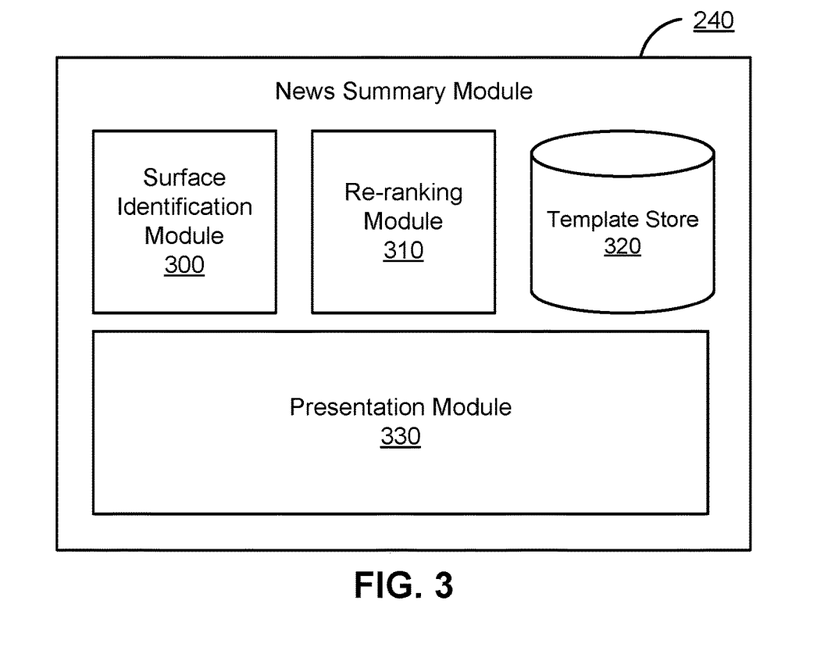
FIG. 3 is a block diagram of an architecture of a news summary module, in accordance with an embodiment.

FIG. 3 is a block diagram of an architecture of the news summary module 240. The news summary module 240 shown in FIG. 3 includes a surface identification module 300, a re-ranking module 310, a template store 320, and a presentation module 330. In other embodiments, the news summary module 240 may include additional, fewer, or different components for various applications.

The surface identification module 300 identifies a surface type associated with a client device 110. In one embodiment, the surface identification module 300 communicates with a client device 110 upon receiving a request from the client device for presentation information to be presented to a user of the online system 120 and identifies a surface type associated with the client device. In another embodiment, the surface identification module 300 stores information on the surface type associated with a client device 110 in association with a client device identifier (e.g., in a database indexed by client device ID or client device model number). In this case, the surface identification module 300 accesses stored surface type information when content items are requested or when generating designated updates such as daily news updates. For example, the surface identification module 300 may identify a client device 110 to be associated with a voice only surface, a voice and visual display surface, or another surface type.

The re-ranking module 310 receives a ranked list of content items and re-ranks the content items based on the type of output surface associated with the client device. The ranked list of content items is ranked based on an affinity of the user of the client device 110 with the content items. In one embodiment, the re-ranking module 310 retrieves a ranked list of content items from the newsfeed manager 230. The re-ranking module 310 receives an identified surface type from the surface identification module 300 indicating the surface type of the client device 110. Based on the identified surface type, the re-ranking module 310 re-ranks the ranked list of content items for presentation to the user of the client device 110 and transmits the re-ranked list of content items to the presentation module 260. An embodiment of the re-ranking module 310 boosts the ranking of particular content items based on the type of content item and the surface type. For example, to re-rank the content items, the re-ranking module 310 may calculate a re-ranking score for each content item based on one or more of: an affinity between the user and the content item, types of content included in the content item (text, images, audio, video, etc.), an amount of each type of content included in the content item, contextual information (e.g., time of day, whether the user is at home, at work or elsewhere, etc.), the identified surface type, a size of a screen of the client device 10 (where it has one), a level of engagement with the content item by other users (e.g., a number of likes on a social network), a measure of diversity relative to other content items in the ranked list (e.g., if most of the content items are photographs and there is a single video, the video ranking might be boosted), and the like.

In one example, the re-ranking module 310 identifies a client device 110 with an audio only surface type and re-ranks the ranked list of content items such that text only content items (which can be converted to audio using text-to-speech), content items associated with audio data, and other content items that may be converted to audio data are boosted. In another example, the re-ranking module 310 identifies a client device 110 with a visual display only surface and re-ranks the ranked list of content items such that text content items, photo content items, and other graphical content items are boosted. In an embodiment, the re-ranking module 310 may additionally identify for client devices 110 associated with a visual display surface type a visual display size. The re-ranking module 310 may re-rank the ranked list of content items based at least in part on the visual display size. For example, the re-ranking module 310 may identify a small visual display size and re-rank the ranked list of content items such that text only content items are boosted more highly than photo content items. In another example, the re-ranking module 310 may identify a client device 110 has audio capabilities and large visual display size (such as a laptop) and re-rank the ranked list of content items to boost photo content items, video content items, and larger text content items.

The template store 320 stores and maintains templates that may be applied to content items to generate presentation information for presentation to users of the online system 120. A template may include, for example, text, audio, graphical, and/or other elements, as well as modifiable fields and formatting information to apply to a content item in generating presentation information. The modifiable fields are filled in using information extracted from the content item. For example, modifiable fields in templates might include of a field for a name of a user who created the content item, a field for the type of content item, a field for a summary of a content item, a field for graphical or video elements associated with a content item, and the like.

In one embodiment, a template includes instructions for how the presentation module 330 should fill the fields based on the content item. The instructions define how the presentation module 330 should extract appropriate information from the content item (and, possibly, other data sources) to complete the template correctly. For example, a simple template for presenting an article shared by one of the user's friends might include a name field, an article title field, and an article summary field. The instructions for filling the name field might include extracting a user ID of the creator from the content item and using it to look up the user's name (e.g., in the user profile store 200). The instructions for filling the title field might include identifying the article's headline (e.g., based on size and location within the article). The instructions may include invoking a machine-learned summarization system. The machine-learned summarization system can be trained using a training set of input articles paired with corresponding human-generated summaries. Once trained, the machine-learned summarization system is used to extract information from the content items and produce summaries similar to those that would be produced by a human.

The templates are specific to one or more client device surface types and content item types. Such a template includes modifiable fields that are customized based on the user, the client device surface type, information in the content item, and/or other factors. Thus, presentation of a given content item can be customized to the particular surface of the user's client device 110. The template store 320 may store one or more templates associated with a voice only surface type and a text only content item. In contrast, a template for the same content item and a visual display may just present the article or provide a text field summarizing the article and why it is being suggested along with a link to the full article. For example, if one of a user's connections in a social network, Ryan, shared an article and tagged the user, a template for a voice only surface might generate the audio output "Ryan tagged you in an article about satire. Should I read it to you?" while a template for a graphical only surface might generate the text output "You have been tagged by Ryan in an article titled 'How to Tell if an Article Has Been Faked.' Would you like to view the whole article?" along with a link to the article).

In some embodiments, there are multiple templates associated with each combination of surface type and content type (and display size, where appropriate). This may make the presentation of content seem more human as different phrasings and structures may be used. For example, returning to the example of Ryan sharing an article used above, there may be multiples templates associated with the combination of voice only surface and a shared article that can be used to present the information that Ryan tagged the user in an article in different ways (e.g., "Ryan tagged you in an article about satire. Should I read it to you?" "You have been tagged by Ryan in an article titled 'How to Tell if an Article Has Been Faked.' Would you like to hear the article?").

The presentation module 330 receives a re-ranked list of content items for presentation to a user of a client device 110 from the re-ranking module 310, selects a subset of the content items based on the new rankings, applies templates to the selected content items to generate presentation information, and transmits the presentation information to the client device. In one embodiment, the presentation module 330 additionally receives from the re-ranking module 310 the surface type of the client device 110 and the display size of the client device. Based on the surface type and display size of the client device 110 and the content item type, the presentation module 330 accesses the template store 320 and retrieves a template for each of the content items in the re-ranked list of content items. Thus, the presentation information generated by applying the templates may be tailored to the specific output surface.

In some embodiments, the presentation module 330 randomly selects between two or more templates associated with the surface type and display size of the client device 110 and the content item type. Alternatively, the presentation module 330 may select between one or more templates associated with the surface type and display size of the client device 110 and the content item type based on other criteria, including whether a template has been recently used (e.g., within the last three content items used to generated presentation information). In either case, the use of different templates for similar content items that are presented on the same surface provides variation in the presentation of content items to users of the online system 120. This may make the output seem more "human" and increase user engagement. Regardless of the precise details of how the presentation information is generated, the presentation module 330 transmits it to the client device 110 to be displayed to the user.

Selecting Content Items for Presentation Based on Surface Type

Figure 4:
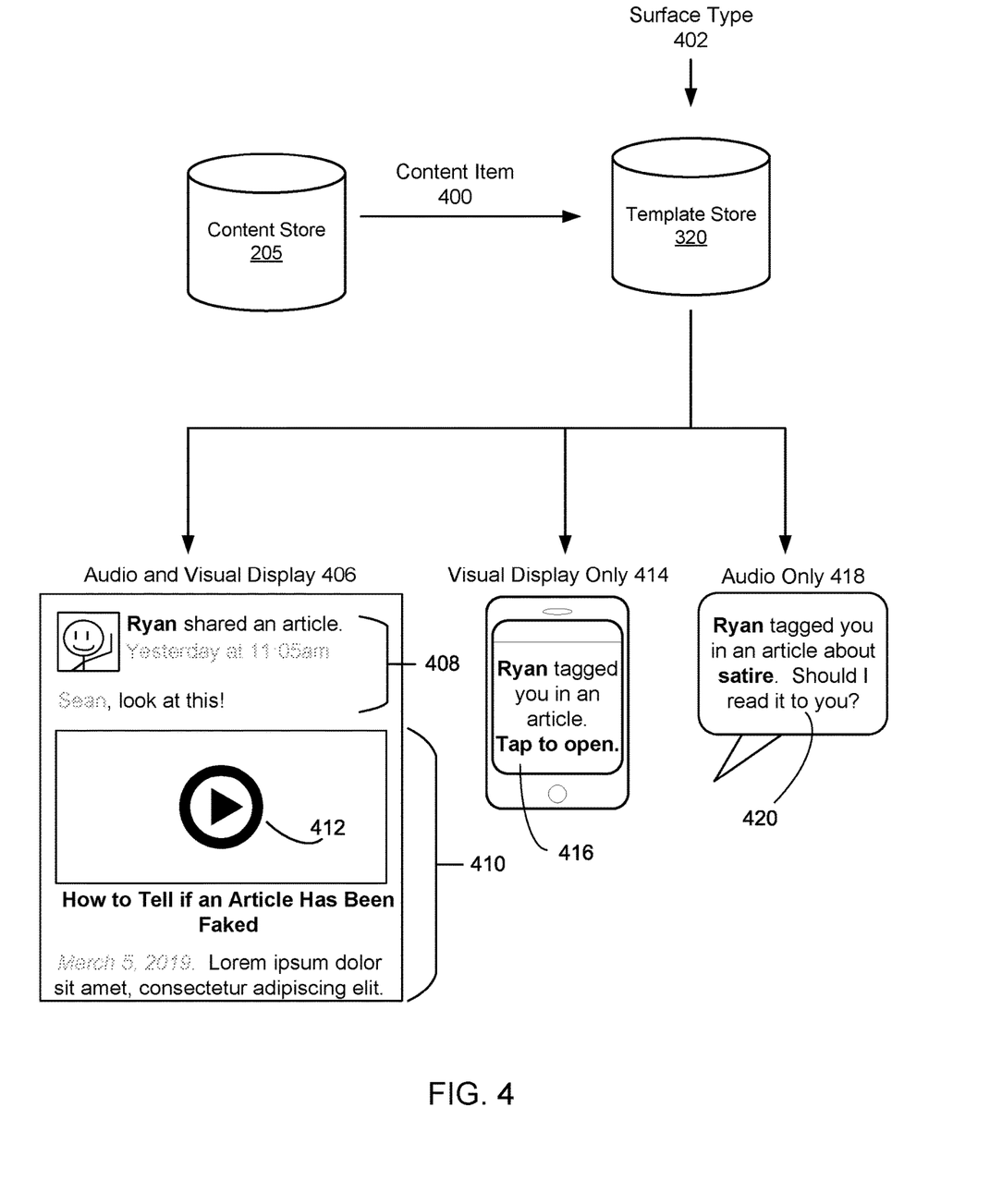
FIG. 4 is a flow diagram of a method for selecting content items for presentation based on a surface type, in accordance with an embodiment.

FIG. 4 is an example illustrating the selection and application of a template to a selected content item for presentation based on a surface type, in accordance with an embodiment. For the purposes of describing FIG. 4, it is assumed that the news summary module 240 has selected the shared article to be presented to the user. The online system 120 determines a type of the content item (in this case, an article that includes a video). In one embodiment, content item types include: text only status updates, photos, videos, audio, short articles (e.g., less than 300 words), and long articles (e.g., 300 words or more). The content item types can also include hybrid types, such as: photo with text caption, short article with images, long article with a video, etc.

As shown in FIG. 4, the user is associated with three different client devices 110. One with audio and a visual display 406, one with only a visual display 414, and one with only audio 418. The online system 120 identifies the client device 110 that the user is currently using (or will be using when the presentation information is presented). In other embodiments, a user may be associated with additional, fewer, or different client devices than shown in FIG. 4.

The online system 120 retrieves the content item 400 from the content store 205 and surface type information 402 (e.g., from the client device 110 or a database mapping client devices to surface types). The online system 120 determines the type of the content item 400 and accesses the template store 320 to select a template for the content item 400 based on the content item type and the surface type information. In one embodiment, the content item type is stored in association with the content item in the content store 205. In another embodiment, the online system 120 analyzes the content item determine its type (e.g., by determining a total number of words, pictures, videos, etc. and applying a classifier). In other examples, different templates may be used for the surface types and content item types shown in FIG. 4.

In a case wherein the identified surface type is an audio and visual display 406 (e.g., a laptop computer, a mobile phone, etc.), the online system 120 may select and apply a template from the template store 320 associated with audio and visual presentation information and the content item type of the selected content item. Alternatively, the online system 120 may select between one or more templates associated with audio and visual output data and the content item type. In the example of FIG. 4, the selected template identifies a header 408 containing an icon associated with the posting user of the content item, text identifying the posting user of the content item ("Ryan"), the content item type ("shared an article"), the timestamp associated with the content item ("Yesterday at 11:05 am"), and text posted by the posting user of the content item in association with the shared article ("Sean, look at this!"). The online system 120 additionally generates information 410 about the shared article to include in the selected template. In one embodiment, the online system 120 accesses the shared article to identify keywords, videos, images, text, or metadata associated with the article. In the example shown, the selected template includes a title ("How to Tell if an Article Has Been Faked"), a video 412 associated with audio and visual data, and text indicating an associated timestamp ("March 5, 2019.") and an excerpt of the shared article ("Lorem ipsum dolor amet . . . ").

In a case wherein the identified surface type is a visual only display 414 (e.g., a smart watch), the online system 120 may select and apply a template from the template store 320 associated with visual output data and the content item type of the selected content item. As in the previous case, the online system 120 may select between one or more templates associated with visual output data and the content item type. In the example of FIG. 4, the selected template identifies text 416 to present to the user of the visual only client device 110, including a name associated with the posting user of the content item ("Ryan"), the type of content item ("tagged you in an article"), and an invitation for the user of the client device 110 to interact with the content item ("Tap to open"). In one embodiment, upon receiving the interaction from the user, the client device 110 transmits a request to the online system 120 to provide the content item in part or in full. In another embodiment, the client device 110 transmits a request to the online system 120 to provide a summary of the associated content item.

In a case wherein the identified surface type is audio only 418 (e.g., a voice system), the online system 120 may select and apply a template from the template store 320 associated with audio output data and the content item type of the selected content item. As in the previous case, the online system 120 may select between one or more templates associated with audio output data and the content item type. In the example of FIG. 4, the selected template identifies audio data 420 to present to the user of the voice only client device 110 representing the words "Ryan tagged you in an article about satire. Should I read it to you?" Based on the selected content item, the audio data includes a name associated with the posting user of the content item ("Ryan"), the type of content item ("tagged you in an article about satire"), and an invitation for the user of the client device 110 to interact with the content item ("Should I read it to you?"). In one embodiment, upon receiving the interaction from the user, the client device 110 transmits a request to the online system 120 to access the content item and retrieve audio data representative of the content item to transmit to the user of the client device.

Figure 5:
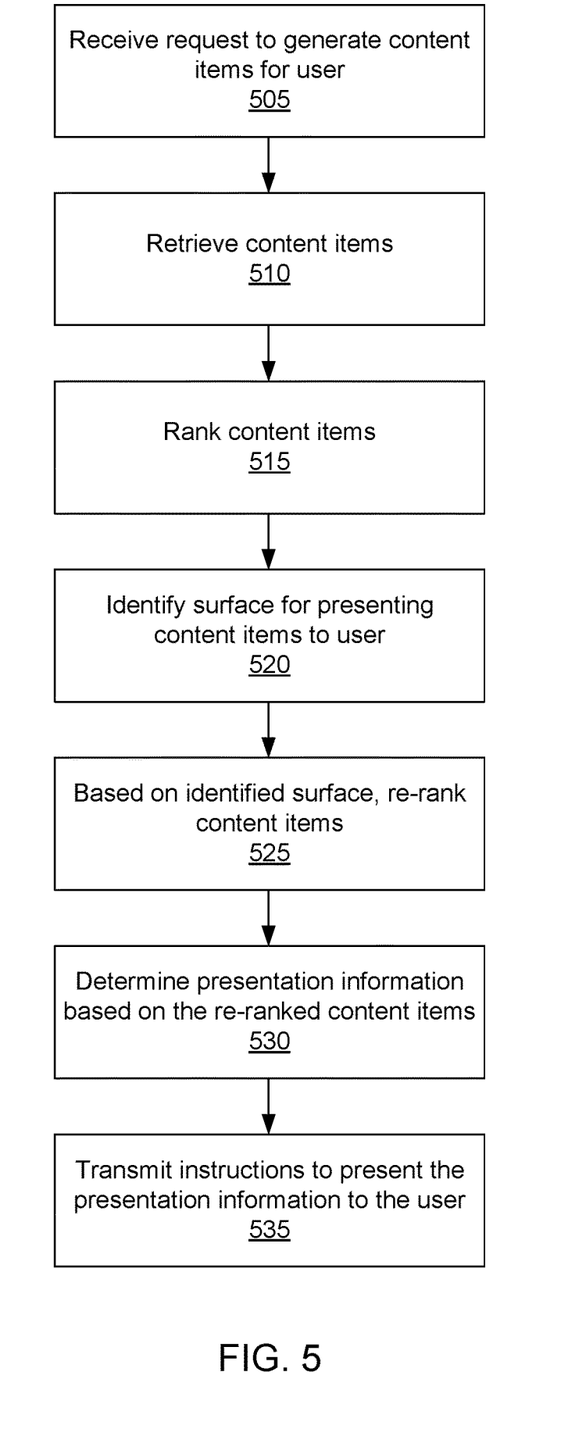
FIG. 5 is a flow diagram of a method for applying a template to a selected content item for presentation based on a surface type, in accordance with an embodiment.

FIG. 5 is a flow diagram of a method for selecting content items for presentation based on a surface type, in accordance with an embodiment. The steps of FIG. 5 may be performed by the online system 120. Some or all of the steps may be performed by other entities in other embodiments. In addition, other embodiments may include different and/or additional steps and the steps may be performed in different orders.

The online system 120 receives 505 a request to generate content items for presentation to a user of a client device 110. The online system 120 retrieves 510 content items from a content store 205 and ranks 515 the content items. In one embodiment, the online system 120 ranks the content items based on a likelihood that the user of the client device 110 will interact with the content item upon being presented with the content item. The online system 120 identifies 520 the surface type for presenting the content items to the user. Based on the identified surface, the online system 120 re-ranks 525 the content items and determines 530 presentation information for the re-ranked content items. For example, presentation information may specify formatting for elements of the content items. The online system 120 then transmits 535 instructions to display the content to the client device 110, the instructions based on the determined presentation information.

Figure 6:
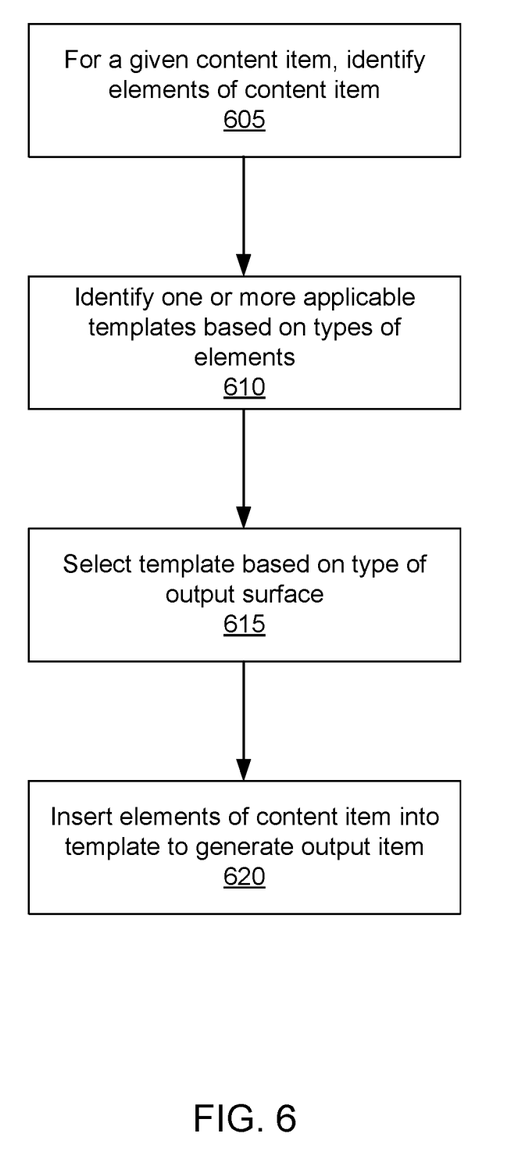
FIG. 6 is an example illustrating applying a template to a selected content item for presentation based on a surface type, in accordance with an embodiment.

FIG. 6 is a flow diagram of a method for applying a template to a selected content item for presentation based on a surface type, in accordance with an embodiment. The steps of FIG. 6 may be performed by the online system 120. Some or all of the steps may be performed by other entities in other embodiments. In addition, other embodiments may include different and/or additional steps and the steps may be performed in different orders.

For a given content item, the online system 120 identifies 605 elements of the content item. The elements may have different types corresponding to different types of content. For example, elements may include images, video data, and text, as well as users, tagged locations, tagged objects of the online system, and others. Based on the identified elements, the online system 120 identifies 610 one or more applicable templates and selects 615 one of the one or more applicable templates. In one embodiment, the selection is based on the type of surface of the client device 110 as discussed in association with FIG. 3. The online system 120 inserts 620 elements of the content item into the selected template to generate a completed output item to be presented to the user of the client device 110.

Figure 7:
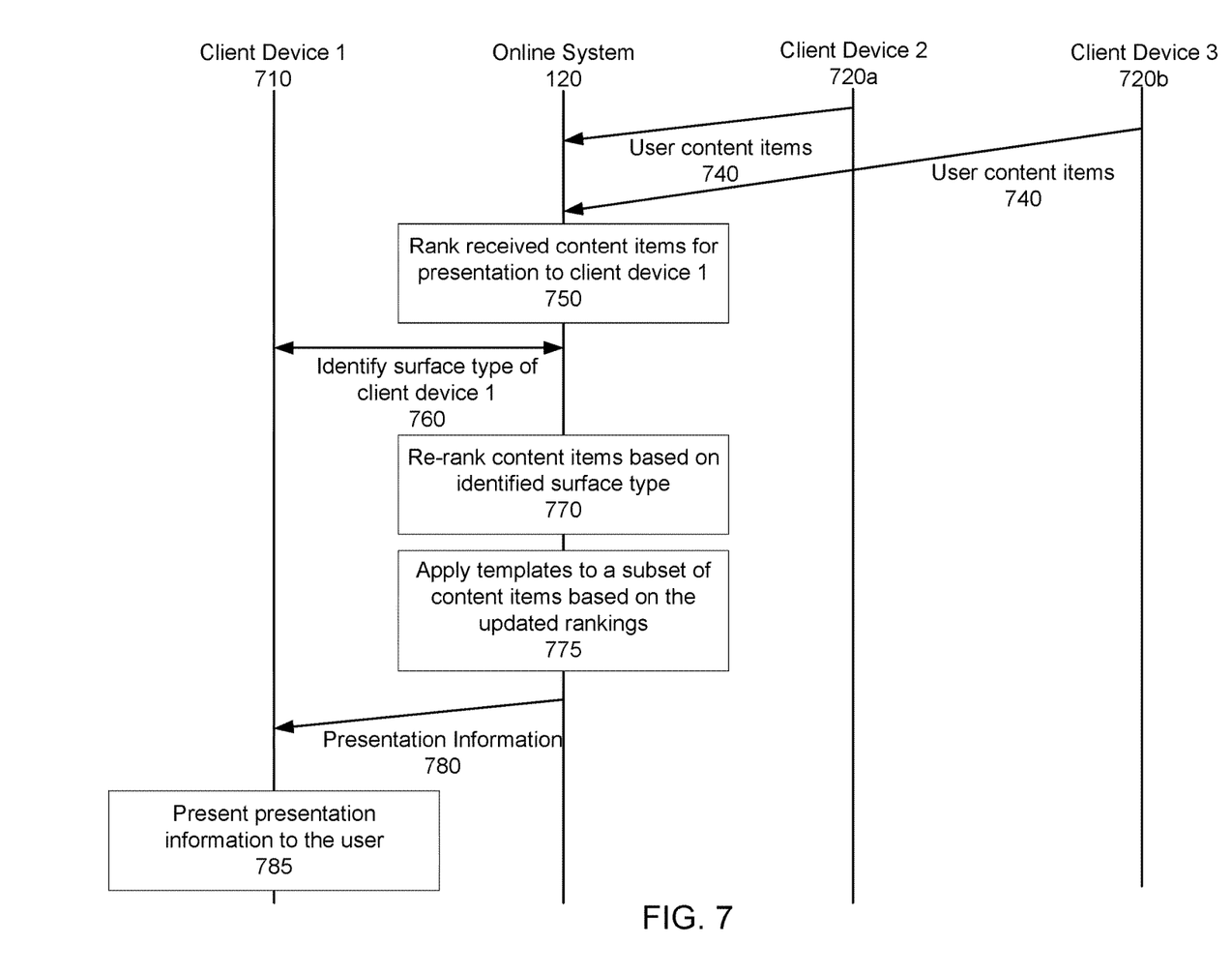
FIG. 7 is a transaction diagram illustrating interaction between an online system and client devices, in accordance with an embodiment.

FIG. 7 is a transaction diagram illustrating interaction between an online system 120 and client devices 710, 720, in accordance with an embodiment. In the embodiment shown, one or more client devices 720 transmit 740 user content items to the online system 120. In other embodiments, additional or fewer client devices may transmit user content items. The online system 120 ranks 750 content items for presentation to the first client device 710. In one embodiment, the online system 120 may rank received user content items and stored content items. The online system 120 communicates with the first client device 710 to identify 760 the surface type of the first client device. Based on the identified surface type, the online system 120 re-ranks 770 the content items and applies 775 templates to a subset of the content items based on the updated rankings. The online system 120 then transmits 780 presentation information to the first client device 710 for presentation 785 to the user. In another embodiment, the subset of content items may be sent to the first client device 710 and the templates may be applied 775 at the first client device. In further embodiments, different or additional entities may perform some of the operations. Additionally, different operations may be performed and/or some of the operations may be performed in different orders and/or in parallel.

Computer Architecture

Figure 8:
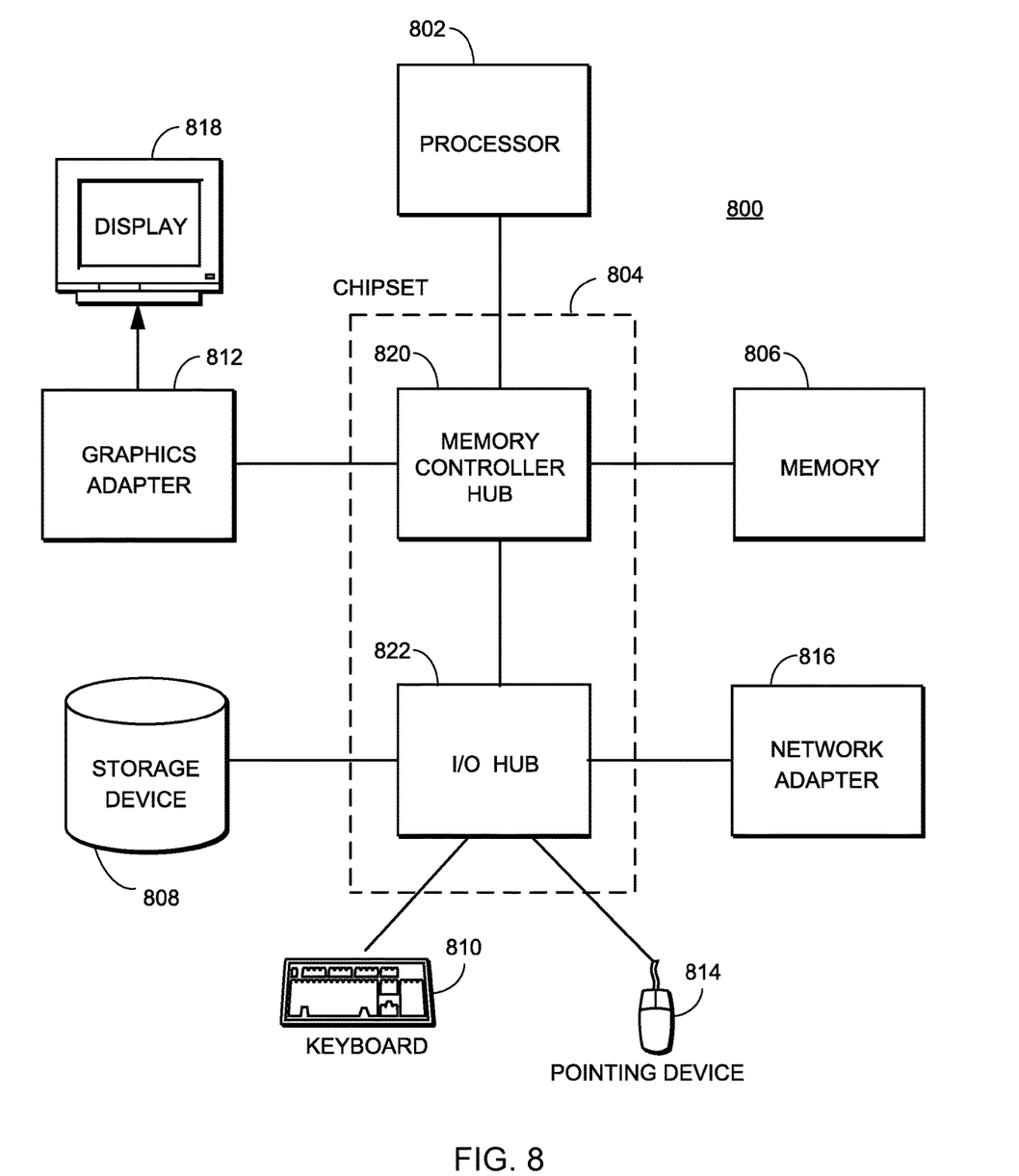
FIG. 8 is a high-level block diagram illustrating physical components of a computer used as part or all of one or more of the entities described herein in one embodiment.

FIG. 8 is a high-level block diagram illustrating physical components of a computer 800 used as part or all of one or more of the entities described herein in one embodiment. For example, instances of the illustrated computer 800 may be used as a server operating the messaging system 130. Illustrated are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O hub 822. In another embodiment, the memory 806 is coupled directly to the processor 802 instead of the chipset 804. In one embodiment, one or more sound devices (e.g., a loudspeaker, audio driver, etc.) is coupled to chipset 804.

The storage device 808 is any non-transitory computer-readable storage medium, such as a hard drive, compact disk read-only memory (CD-ROM), DVD, or a solid-state memory device. The memory 806 holds instructions and data used by the processor 802. The pointing device 814 may be a mouse, track ball, or other type of pointing device, and is used in combination with the keyboard 810 to input data into the computer 800. The graphics adapter 812 displays images and other information on the display 818. The network adapter 816 couples the computer system 800 to a local or wide area network.

As is known in the art, a computer 800 can have different and/or other components than those shown in FIG. 8. In addition, the computer 800 can lack certain illustrated components. In one embodiment, a computer 800 acting as a server may lack a keyboard 810, pointing device 814, graphics adapter 812, and/or display 818. Moreover, the storage device 808 can be local and/or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 802.

CONCLUSION

The techniques described above may provide various advantages over existing systems. As an example, the news summarization approaches may improve the efficiency of computing devices when used to access current information. A user's time and effort is not wasted trying to interpret content that is not well suited to the surface of the client device the user is using. Thus, the user interface of the client device may be improved by providing more efficient access to pertinent and understandable information without it being obscured by content that is not suitable or not easily presented by the client device.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving a request to generate a content summary for presentation to a user;
receiving a set of content items for the user;
identifying a client device for presenting the content summary to the user;
identifying a surface type of the client device for presenting the content summary to the user, the surface type being identified from a plurality of surface types;
identifying one or more types of content that are available to be output by the surface type;
ranking the set of content items based on the one or more types of content that are available to be output by the surface type;
selecting a subset of the content items based on the ranked set of content items;
determining presentation information based on the subset of the content items, the presentation information including instructions on presenting the content summary to the user, wherein determining presentation information comprises:
for each of the content items in the subset of the content items, identifying elements of the content item, each element having a content type;
identifying one or more applicable templates based on the content types of the identified elements;
selecting a template from the one or more applicable templates based on the surface type;
extracting elements of the content item, the extracted elements identified based on one or more fields of the selected template;
inserting the extracted elements of the content item into the selected template to generate presentation information for the content item; and
transmitting the presentation information to the client device.

2. The method of claim 1, wherein selecting a template from the one or more applicable templates based on the surface type further comprises:
identifying one or more applicable templates based on the surface type; and
randomly selecting a template from the one or more applicable templates.

3. The method of claim 1, wherein the identified surface type is a voice only surface, a voice and graphical display surface, or a graphical display only surface.

4. The method of claim 1, wherein identifying a surface type of the client device for presenting the content summary comprises:
obtaining an identifier of a client device that the user is currently using; and
querying a data store using the identifier to retrieve information on a surface type associated with the client device.

5. The method of claim 1, wherein ranking the set of content items comprises:
calculating a ranking score for each content item based on a plurality of factors, the plurality of factors including: an affinity between the user and the content item, a type of content included in the content item, and the identified surface type; and
ranking the set of content items according to the ranking scores.

6. A non-transitory computer-readable storage medium storing computer program instructions executable by a processor to perform operations comprising:
receiving a request to generate a content summary for presentation to a user;
receiving a set of content items for the user;
identifying a client device for presenting the content summary to the user;
identifying a surface type of the client device for presenting the content summary to the user, the surface type being identified from a plurality of surface types;
identifying one or more types of content that are available to be output by the surface type;
ranking the set of content items based on the one or more types of content that are available to be output by the surface type;
selecting a subset of the content items based on the ranked set of content items;
determining presentation information based on the subset of the content items, the presentation information including instructions on presenting the content summary to the user, wherein determining presentation information comprises:
for each of the content items in the subset of the content items, identifying elements of the content item, each element having a content type;
identifying one or more applicable templates based on the content types of the identified elements;
selecting a template from the one or more applicable templates based on the surface type;
extracting elements of the content item, the extracted elements identified based on one or more fields of the selected template;
inserting the extracted elements of the content item into the selected template to generate presentation information for the content item; and
transmitting the presentation information to the client device.

7. The computer-readable storage medium of claim 6, wherein selecting a template from the one or more applicable templates based on the surface type further comprises:
identifying one or more applicable templates based on the surface type; and
randomly selecting a template from the one or more applicable templates.

8. The computer-readable storage medium of claim 6, wherein the identified surface type is a voice only surface, a voice and graphical display surface, or a graphical display only surface.

9. The computer-readable storage medium of claim 6, wherein identifying a surface type of the client device for presenting the content summary comprises:
obtaining an identifier of a client device that the user is currently using; and querying a data store using the identifier to retrieve information on a surface type associated with the client device.

10. The computer-readable storage medium of claim 6, wherein ranking the set of content items comprises:
  calculating a ranking score for each content item based on a plurality of factors, the plurality of factors including: an affinity between the user and the content item, a type of content included in the content item, and the identified surface type; and
  ranking the set of content items according to the ranking scores.

11. A system comprising:
  a computer processor for executing computer program instructions; and
  a non-transitory computer-readable storage medium storing computer program instructions executable by the processor to perform operations comprising:
    receiving a request to generate a content summary for presentation to a user;
    receiving a set of content items for the user;
    identifying a client device for presenting the content summary to the user;
    identifying a surface type of the client device for presenting the content summary to the user, the surface type being identified from a plurality of surface types;
    identifying one or more types of content that are available to be output by the surface type;
    ranking the set of content items based on the one or more types of content that are available to be output by the surface type;
    selecting a subset of the content items based on the ranked set of content items;
    determining presentation information based on the subset of the content items, the presentation information including instructions on presenting the content summary to the user, wherein determining presentation information comprises:
      for each of the content items in the subset of the content items, identifying elements of the content item, each element having a content type;
      identifying one or more applicable templates based on the content types of the identified elements;
      selecting a template from the one or more applicable templates based on the surface type;
      extracting elements of the content item, the extracted elements identified based on one or more fields of the selected template;
      inserting the extracted elements of the content item into the selected template to generate presentation information for the content item; and
      transmitting the presentation information to the client device.

12. The system of claim 11, wherein selecting a template from the one or more applicable templates based on the surface type further comprises:
  identifying one or more applicable templates based on the surface type; and
  randomly selecting a template from the one or more applicable templates.

13. The system of claim 11, wherein the identified surface type is a voice only surface, a voice and graphical display surface, or a graphical display only surface.

14. The system of claim 11, wherein identifying a surface type of the client device for presenting the content summary comprises:
  obtaining an identifier of a client device that the user is currently using; and
  querying a data store using the identifier to retrieve information on a surface type associated with the client device.

* * * * *

UNITED STATES PATENT AND TRADEMARK OFFICE
CERTIFICATE OF CORRECTION

PATENT NO. : 10,803,077 B2
APPLICATION NO. : 15/966494
DATED : October 13, 2020
INVENTOR(S) : Fuchun Peng et al.

It is certified that error appears in the above-identified patent and that said Letters Patent is hereby corrected as shown below:

In the Claims

Column 16, Line 52, Claim 7, delete "The computer-readable storage medium" and insert -- The non-transitory computer-readable storage medium --.

Column 16, Line 59, Claim 8, delete "The computer-readable storage medium" and insert -- The non-transitory computer-readable storage medium --.

Column 16, Line 63, Claim 9, delete "The computer-readable storage medium" and insert -- The non-transitory computer-readable storage medium --.

Column 17, Line 4, Claim 10, delete "The computer-readable storage medium" and insert -- The non-transitory computer-readable storage medium --.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*